United States Patent

[11] 3,603,003

| [72] | Inventor | Frank L. Ziegler |
| | | P.O. Box 235, Eureka, Calif. 95501 |
| [21] | Appl. No. | 23,857 |
| [22] | Filed | Mar. 30, 1970 |
| [45] | Patented | Sept. 7, 1971 |

[54] EDUCATIONAL GAME BOARD ASSEMBLY
17 Claims, 19 Drawing Figs.

[52] U.S. Cl. .................................................... 35/9 R
[51] Int. Cl. .................................................... G09b 7/02
[50] Field of Search ....................................... 35/9 R, 48
R, 48 A, 48 B, 22 R

[56] References Cited
UNITED STATES PATENTS

| 3,024,020 | 3/1962 | Alton | 35/22 R X |
| 3,067,524 | 12/1962 | Parker | 35/9 R |
| 3,106,027 | 10/1963 | Thelen | 35/9 R |
| 3,319,359 | 5/1967 | Rosenfield | 35/48 R |

Primary Examiner—Wm. H. Grieb
Attorney—John J. Leavitt

ABSTRACT: Presented is a game board assembly for teaching or amusement purposes, including electrical contact means conditioned by the insertion of a coded card bearing a question, the card being coded in correlation to the correct answer to the question, and a multiplicity of cross points one of which is correlated to the correct answer to the question and is adapted to be selected by the contestant or student so as to signify selection of the correct answer to the question.

PATENTED SEP 7 1971 3,603,003

INVENTOR:
FRANK L. ZIEGLER

BY John J. Leavitt

INVENTOR:
FRANK L. ZIEGLER

BY John J. Leavitt

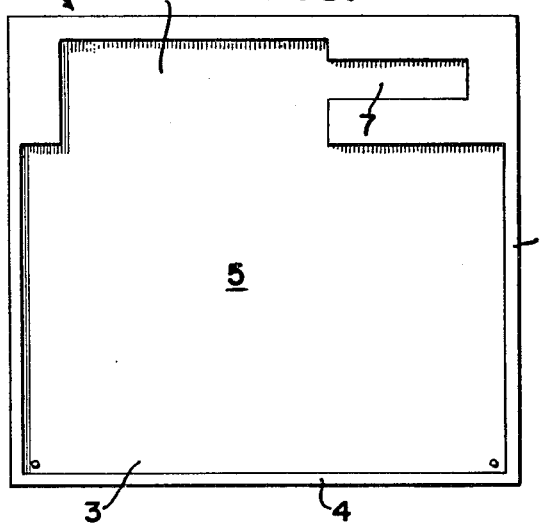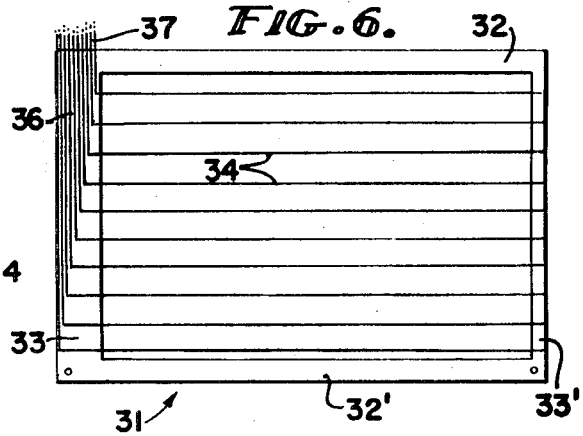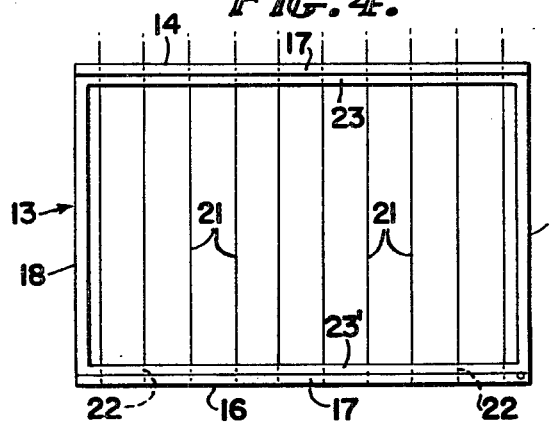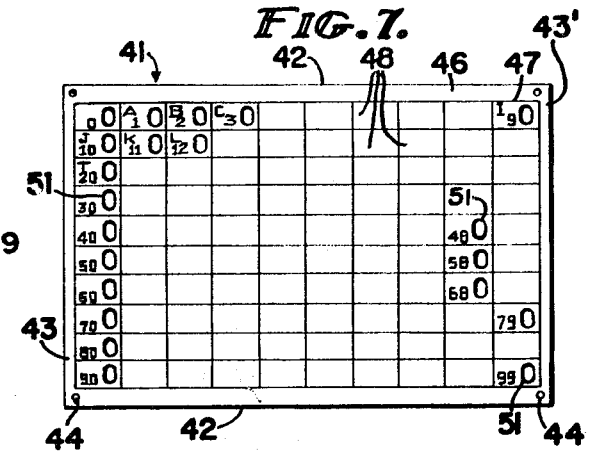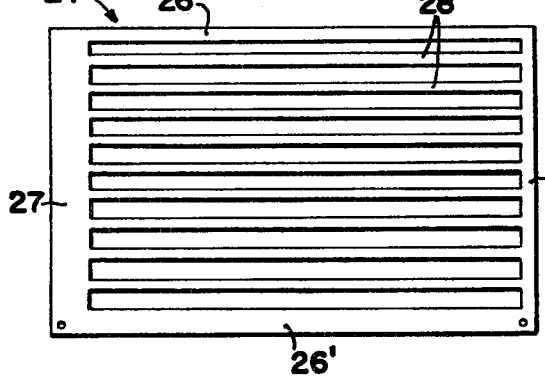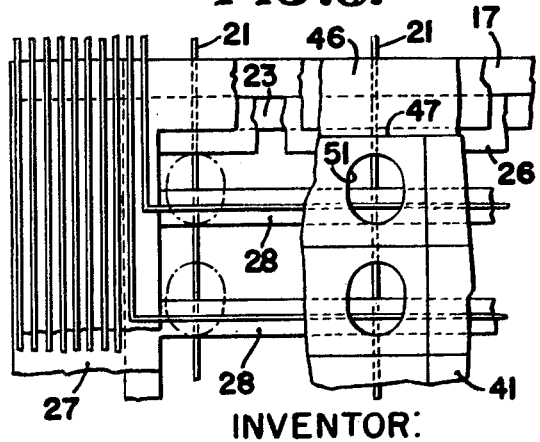

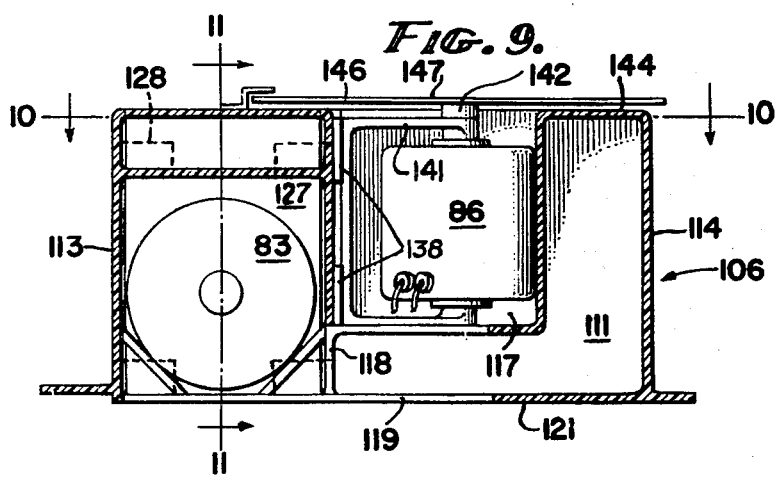
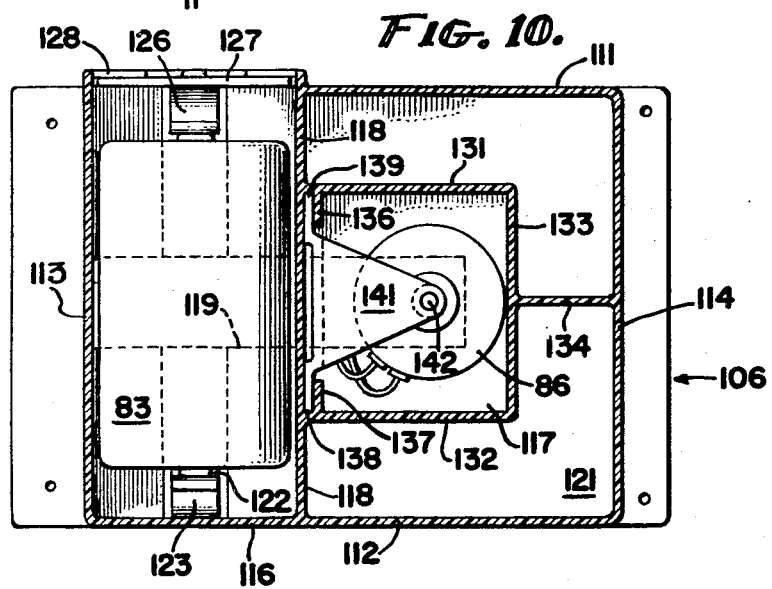
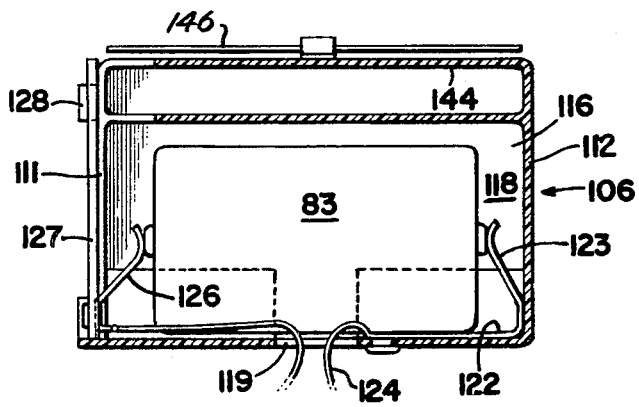
INVENTOR:
FRANK L. ZIEGLER
BY John J. Leavitt

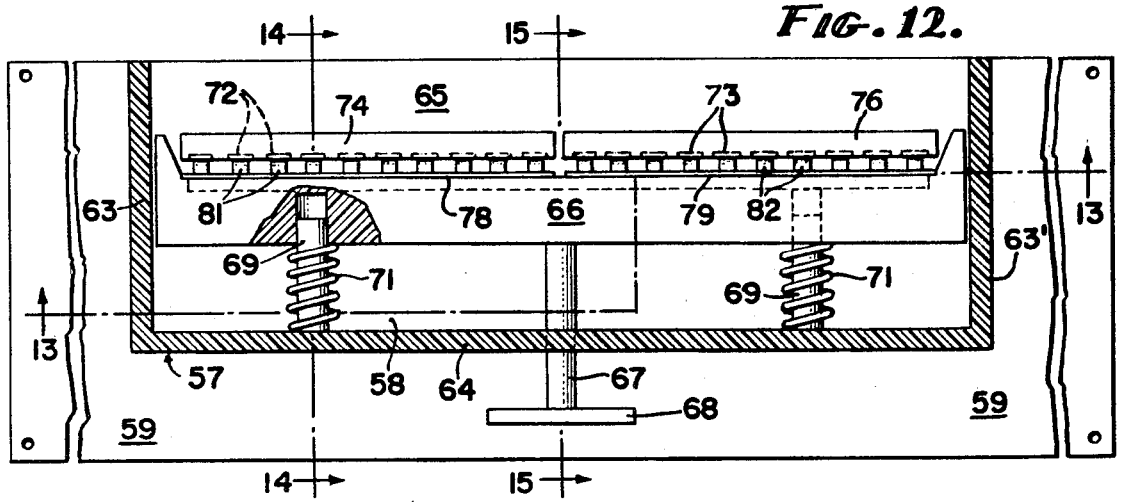
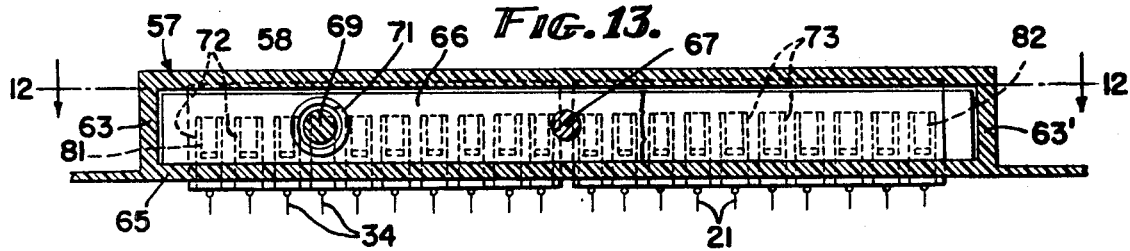
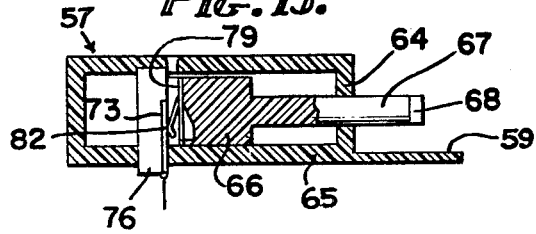
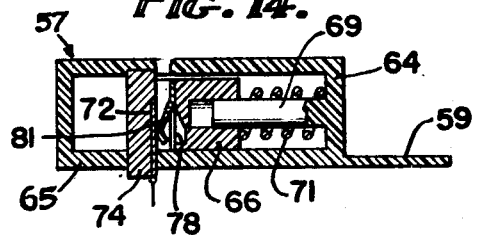
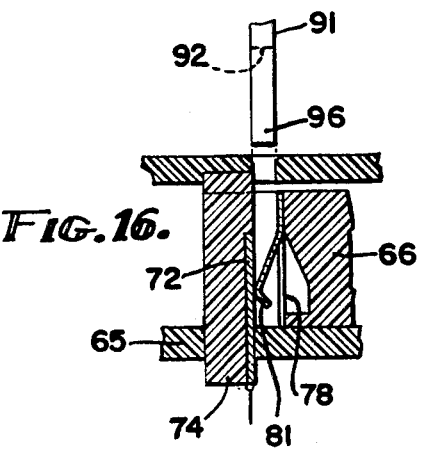
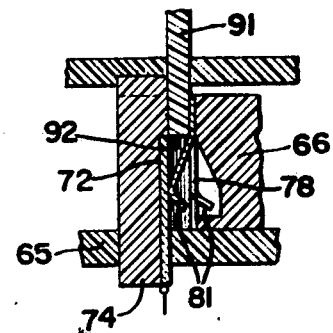
INVENTOR:
FRANK L. ZIEGLER
BY John J. Leavitt

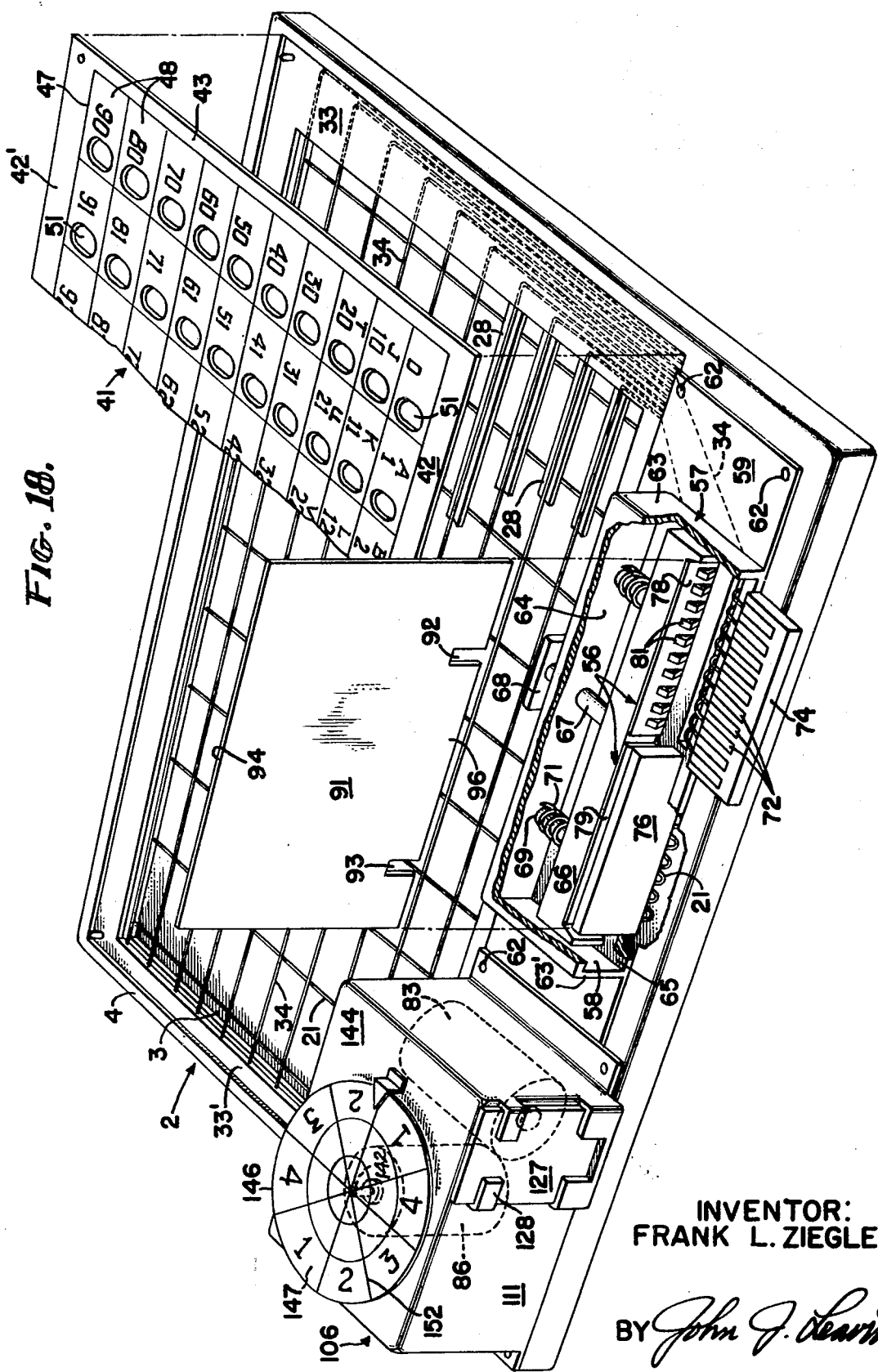

3,603,003

EDUCATIONAL GAME BOARD ASSEMBLY

BACKGROUND OF INVENTION

In recent years it has been recognized that much useful information may be learned through games which test the knowledge of contestants. Such games have been categorized as "educational games," "adult games," or "teaching machines." Basically, it is the purpose of such games to test the contestant's intellect by forcing him to answer a question, solve a mathematical equation, or select the single correct answer from a multiplicity of answer choices, all except one of which is incorrect. Signification means is energized when the right answer has been selected. Such signification means may take the form of an aural or visual signal, or may include a rotatable dial having numerical or other indicia, such as color, thereon which through rotation may be correlated with an appropriate index to determine by chance or otherwise the score achieved.

One of the difficulties with such games has been that when categorized as "teaching machines" they fail to provide "amusement" for the participants, thus defeating one of the basic purposes of the game. Accordingly, it is one of the objects of the invention to provide a game board assembly designed primarily to provide amusement for participants, and which as an incident to such amusement teaches the participants the correct answer to a given question or problem.

Another problem that has existed with "teaching machines" has been their cost. Because such machines have been directed primarily to performance of the educational function, their construction has been complex and therefore costly, thus making such machines unavailable to a large segment of the population. Accordingly, it is another object of the invention to provide a "teaching machine" which is simple in its construction, inexpensive to fabricate, and which may be sold within a price range insuring wide availability.

Games or amusement devices of conventional construction are usually limited to the playing of a single game. Greater utility could be derived from such devices if the owner of the game, set, amusement device, or teaching machine could utilize a basic component or combination of components of the device for many different games. Accordingly, it is a still further object of the invention to provide a game board which incorporates a component in the form of a face plate that converts the assembly for any selected game.

It is an advantage in an amusement device or "teaching machine" that selection of a correct answer be signified by aural or visual means. Accordingly, it is another object of the invention to provide such aural and visual means in connection with an amusement device, together with means for energizing such aural and visual means in response to a correct answer selection.

BRIEF SUMMARY OF INVENTION

In terms of broad inclusion, the game board assembly of the invention comprises a main base member on which are supported a multiplicity of electrical conductors forming normally nonconductive cross points, a selected one of which is adapted to be rendered conductive upon the selection of a correct answer to a question. Means are provided on the base forming a multiplicity of normally closed electrical contacts, selected ones of which are retained in an open (nonconductive) condition by insertion of means on which a question to be answered is displayed. The means on which the question is displayed is coded in such a manner that two of the contacts remain in normally closed condition, these two closed contacts being correlated to the correct answer to the question or problem.

Means are also provided for carrying indicia in close association with the multiplicity of cross points, the indicia being related to the correct answer to the question being displayed, so that selection of indicia representing the correct answer will automatically effect completion of an electrical circuit through the selected cross point and energize the signification means connected thereto.

DESCRIPTION OF DRAWINGS

FIG. 3 is a plan view in reduced scale of the main base member apart from any other structure.

FIG. 4 is a plan view in reduced scale of one of the frames supporting one set of cross point conductors.

FIG. 5 is a plan view in reduced scale of a spacer frame adapted to be superimposed over the cross point conductor frame illustrated in FIG. 4.

FIG. 6 is a plan view in reduced scale of a second frame supporting a set of cross point conductors and adapted to be superimposed over the spacer frame illustrated in FIG. 5.

FIG. 7 is a plan view in reduced scale of a face plate adapted to be superimposed over the cross point conductor frame illustrated in FIG. 6.

FIG. 8 is an enlarged fragmentary plan view illustrating in assembled form portions of the components shown in FIGS. 4 through 7, inclusive.

FIG. 9 is a vertical sectional view illustrating the various components making up the signification means, portions of the structure being shown in elevation.

FIG. 10 is a horizontal sectional view taken in the plane indicated by the line 10—10 in FIG. 9.

FIG. 11 is a vertical cross-sectional view taken in the plane indicated by the line 11—11 in FIG. 9.

FIG. 12 is a horizontal sectional view of the card feed assembly shown apart from the rest of the structure and taken in the plane indicated by the line 12—12 in FIG. 13, portions of the structure being broken away to reveal the underlying structure.

FIG. 13 is a vertical sectional view taken in the plane indicated by the line 13—13 in FIG. 12.

FIG. 14 is a vertical cross-sectional view taken in the plane indicated by the line 14—14 in FIG. 12.

FIG. 15 is a vertical cross-sectional view taken in the plane indicated by the line 15—15 in FIG. 12.

FIG. 16 is a fragmentary sectional view showing the relationship of one of the fixed contact points to an associated movable contact prior to insertion of a coded card.

FIG. 17 is a fragmentary sectional view similar to FIG. 16 but showing the relationship between fixed and movable contacts when a coded card is inserted in the card feed assembly.

FIG. 18 is a perspective view similar to FIG. 2, but showing the interrelationships between the various parts of the structure, portions being broken away in the interest of clarity.

DESCRIPTION OF PREFERRED EMBODIMENT

Main Base Member

Figure 1:
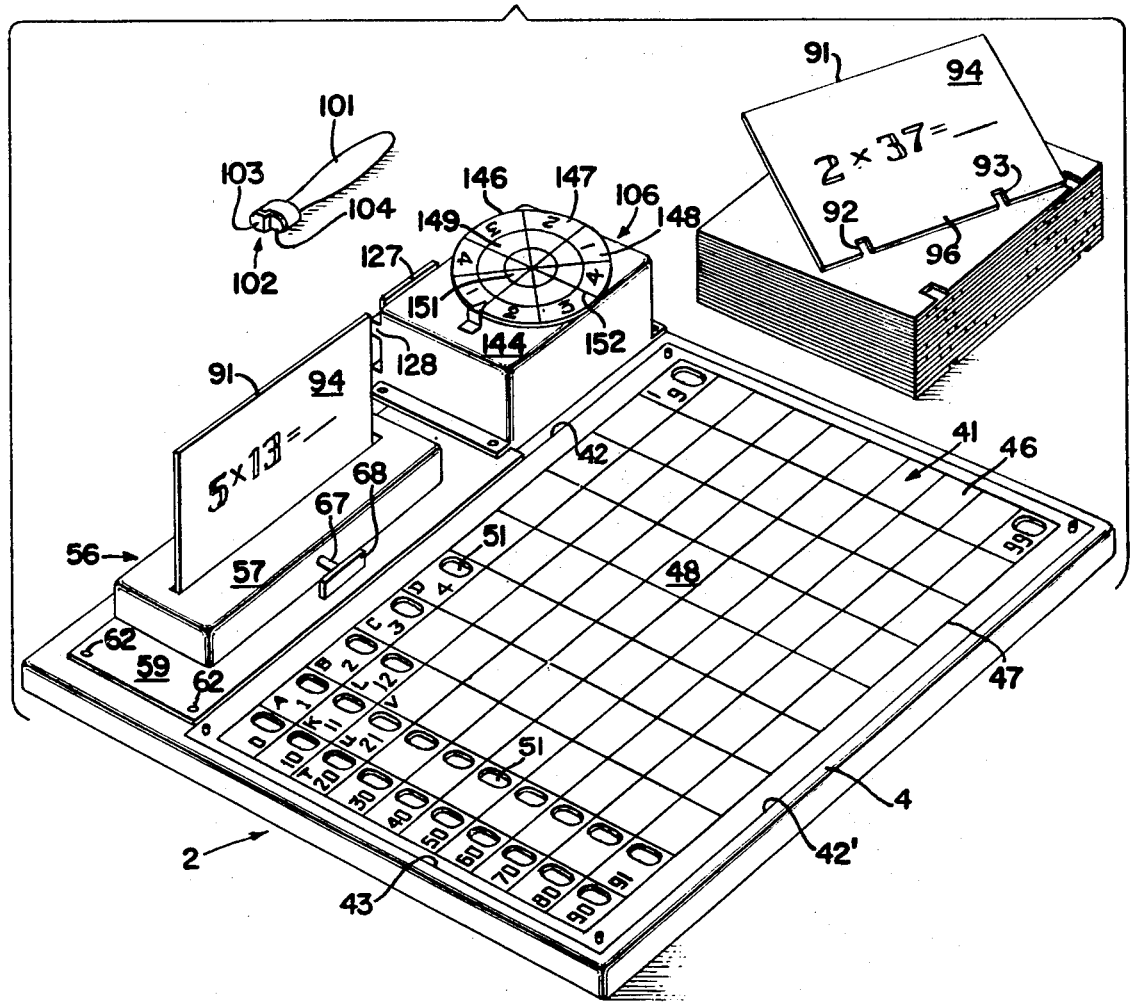
FIG. 1 is a perspective view illustrating the game board assembly.

In terms of greater detail, the game board assembly of the invention comprises a main base member designated generally by the numeral 2, preferably molded from a suitable synthetic resinous material, to provide a hollow receptacle portion 3 enclosed by a rim 4 on three sides and having a bottom 5, the receptacle on its fourth side opening into a well 6 which in turn opens into a recess 7, as shown in FIG. 3. The well 6 is provided with a rim 8, thickened at 9 to define one wall of the recess 7, the opposite wall of which is formed by a peninsular member 12 projecting from rim 4 parallel to wall portion 9. The main base member is formed so as to receive the remaining modular units of the assembly, each of which is appropriately arranged and secured on the main base member as will hereinafter be explained in greater detail.

First Cross-point Conductor Frame

Adapted to fit into the receptacle 3 is a first cross point conductor frame designated generally by the numeral 13, illustrated in plan in FIG. 4. The frame is conveniently rectangular, having two long side rails 14 and 16, which include raised beads 17 and 17' that project above the remainder of side rails 14 and 16 approximately one-sixteenth inch. The short ends of the frame are closed by end rails 18 and 19 which join the rails 14 and 16 in an integral manner so as to facilitate molding of the frame as a single unit from a suitable material. The extra thickness provided by the longitudinal bead 17 is used to embed a multiplicity of cross point conductors 21, conveniently of copper wire, having one end portion 22 embedded for purposes of anchoring in the bead 17' associated with longitudinal frame member 16, and which is stretched across the frame between longitudinal rails 14 and 16 in a taut manner and embedded in the bead 17 associated with longitudinal rail 14 to retain the conductors in taut condition across the frame. The free ends of these conductors extend from the frame for connection in a manner which will be explained in greater detail hereinafter.

Figure 2:
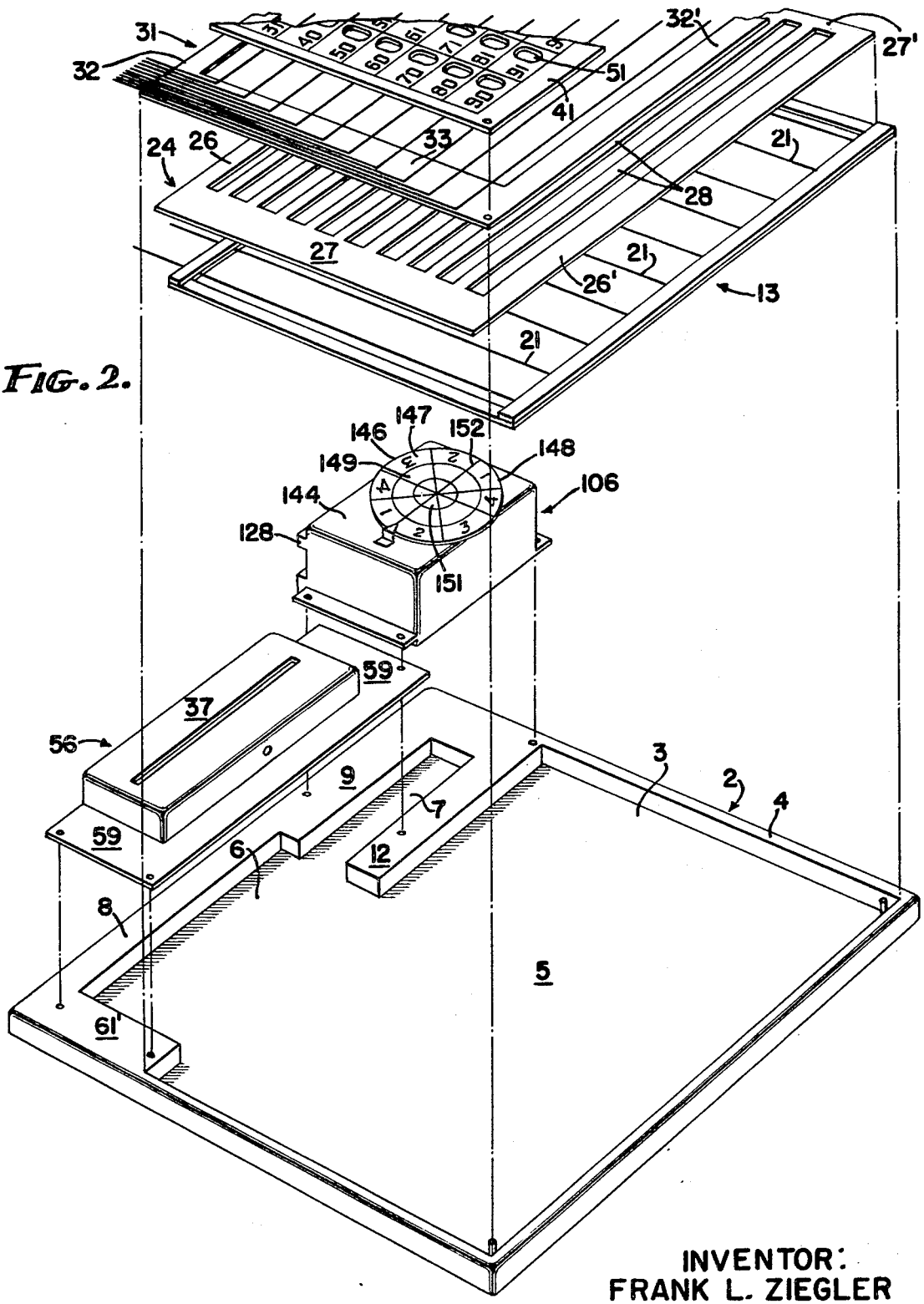
FIG. 2 is a perspective view in exploded form showing the different parts of the game board assembly.

As shown in FIG. 2, frame 13 is proportioned in length and width to fit snugly in recess 3 formed in main base member 2. Since additional components will be superimposed over frame 13 it is not necessary to fasten the frame to the main base member, although where desired, such fastening means could readily be achieved by any appropriate means; e.g., rivets or pins (not shown) inserted through appropriate apertures formed at each corner of the frame. As shown in FIG. 4, longitudinally extending beads 17 and 17' associated with longitudinal rails 14 and 16, respectively, are somewhat narrower in width than the rail members, thus providing seat portions 23 and 23' within which may be seated, if necessary or desirable, a spacer frame designated generally by the numeral 24. It is contemplated that the cross point conductor set may be fabricated by other methods which will eliminate the necessity of a spacer frame per se. For instance, cross point conductors 21 may be formed by depositing a conductive medium, such as copper, on a sheet of synthetic resinous material, such as Mylar.

The spacer frame as illustrated finds special usefulness where the cross point conductors are formed by copper wires that must be stretched taut across the frame. The frame is conveniently fabricated in one integral piece from suitable synthetic resinous material, and includes longitudinal edge rails 26 and 26', and end rails 27 and 27'. Extending longitudinally between the end rails are support bars 28, each of which is no thicker than the end rails, and which are approximately as wide as end rail 27'. Each of the support bars is spaced from adjacent bars and extends parallel thereto and parallel to the longitudinal side rails.

The width of the frame between the outer edges of the longitudinal side rails is proportioned so that spacer frame 24 will fit snugly between beads 17 and 17' of cross point conductor frame 13. In length, the spacer frame is proportioned so that the end rails lie snugly within the flange formed by the sidewalls of the main base member. It will be noted from FIG. 5 that the end rail 27 is somewhat wider than the end rail 27'. The reason is that the spaces between support bars 28 must be long enough to extend completely across all of the ten cross point conductors 21 illustrated in FIG. 4 when the cross point conductor frame 13 is arranged in the receptacle 3 of the main base member so that its right-hand rail 19 lies immediately beneath the right-hand rail 27' of the spacer frame 24. When so arranged the cross point conductors 21 extend perpendicularly across the receptacle 3 with respect to the support bars 28 of the spacer frame and the spaces that separate them.

Superimposed over the spacer frame 24 is a second cross point conductor frame designated generally by the numeral 31, and comprising elongated side rails 32 and 32', and end rails 33 and 33'. The construction of the second cross point conductor frame is clearly shown in FIG. 6. The frame is provided with a multiplicity, preferably 10, longitudinally extending cross-point conductors 34 forming a set of such conductors, with each conductor of the set being spaced from and parallel to adjacent conductors. Each of the conductors is anchored at one end 35 by being imbedded in the end rail 33'. At the opposite end of the frame, each of the conductors is imbedded for a portion of its length in the end rail 33, which is somewhat wider than the end rail 33'.

The width of the end rail 33 is proportioned to receive at least 10 of the conductors arranged in side-by-side spaced relationship, the terminal ends 36 of the conductors extending through the end rail 33 perpendicularly with respect to the sections of the conductors 34 extending longitudinally of the frame. The conductors extend from the frame in a generally flat bundle designated generally by the numeral 37, and are connected to associated circuitry in a manner which will hereinafter be explained. It should be understood that the conductors of both sets of cross point conductors are devoid of electrical insulation over their length that extends across their respective frames. The conductors are held spaced apart as between frames by the spacer frame. It should also be noted that the spacing of cross point Conductor 34 held taut in frame 31 are spaced to coincide with the support bars 28 of the spacer frame so that each cross point conductor 34 lies superimposed over an associated support bar 28.

From the foregoing it will be apparent that the cross point conductors 21 supported in frame 13 extend vertically as viewed in FIG. 4, while the cross point conductors 34 supported in frame 31 extend horizontally as viewed in FIG. 6. With respect to each other, these sets of cross point conductors are thus oriented perpendicular to each other, with the conductors 34 being spaced slightly above the conductors 21 in a normally nonconductive relationship. It should be understood however that it is not necessary that the conductors of each set be perpendicular to each other. It is only necessary that they intersect to form a cross point.

Comparing cross point conductor frame 13 with cross point conductor frame 31, it will be noted that each frame includes ten wires, thus forming 100 cross points. Each cross point is correlated to the correct answer to a given question, and requires only to be selected and connected by appropriate conductive means to energize signification means indicating that the correct answer has been selected. To facilitate such selection and conductive connection, there is superimposed over the cross point conductor assembly a faceplate or template designated generally by the numeral 41 and shown clearly in FIG. 7.

The faceplate is conveniently rectangular in configuration, having long side edges 42 and 42', and short end edges 43 and 43'. It is provided adjacent each corner with an aperture 44 for attachment and alignment of the faceplate to the underlying cross point frames and main base member, and the surface 46 of the faceplate is provided with a rectangular border 47 conveniently printed on the surface 46 and spaced a small distance inwardly from the outer edges of the faceplate. The area within the border is divided by appropriate printed lines into a multiplicity of small rectangular areas 48, preferably one hundred in number, with each rectangular area 48 being numbered consecutively from left to right and from top to bottom, commencing in the upper left-hand corner, with indicia commencing with zero and terminating with numeral 99.

These indicia are conveniently printed within each rectangle, and each rectangle and associated indicia is associated with a single cross point. Such indicia serve to designate the right answer out of a multiple choice of answers to a question displayed. Additionally, 26 of the small rectangles, commencing with the rectangle carrying the indicia number 1, may carry the additional indicia of the alphabet, with each rectangle, starting with number 1, being additionally designated A; B; C etc., with the rectangle carrying the number 26 also being designated by the letter Z. It will thus be seen that questions may be propounded and displayed which require selection of any letter from A through Z as representative of the correct answer of the question being asked, or, in the alternative, the correct answer may require the selection of any number from 0 through 99.

In addition to letters and numbers, each of the small rectangles is also provided with an aperture 51 which lies superimposed over the associated cross point formed by conductors 21 and conductor 34. Each such aperture thus gives access through the face plate to the cross point formed thereunder. Inasmuch as it requires selection of a particular indicia, correlated to the correct answer to a question displayed, to effect energization of the signification means, and in view of the fact that the multiplicity of cross points described above are all in a normally nonconducting condition, means must be provided to condition the cross points so that appropriate selection of one of such cross points, correlated to the correct answer to a question, will result in energization of the signification means, while selection of any other cross point will fail to energize the signification means.

Mounted on the main base member, in close association to the longitudinal edge members 14, 26 and 32 of cross point conductor frame 13, spacer frame 24, and cross point conductor frame 31, respectively, is an electrical contact assembly means designated generally by numeral 56, which fits snugly into well 6 formed in the main base member. The electrical contact assembly conveniently comprises housing 57 having hollow interior 58 and provided with base flanges 59 adapted to overlie, along the left edge of the main base member, a thickened portion 61 of the sidewall defining the well 6. Suitable fastening means 62, such as rivets, for example, project through the base flange 59 adjacent each corner and secure the housing to the underlying main base member.

At its right end, the base flange of the housing overlaps the thickened wall portion 9 of the base member and the inner end of the peninsular member 12, so that the flange covers over a portion of the recess 7. Such an arrangement of the housing on the main base member forms a cover for the well 6 within which is received the ends of cross point conductors 21 and 34 in a manner which will hereinafter be explained.

The housing 57 is conveniently molded from a suitable plastic, and is provided with end walls 63 and 63' and a rear wall 64. Within the hollow interior of the housing, defined by end walls 63, 63', 64 and bottom wall 65, there is provided a spring-pressed pressure bar 66 having an extension 67 outside the housing providing a handle 68 for manipulating the pressure bar. Guide rods 69 serve to guide movement of the pressure bar toward the rear wall 64. Coil compression springs 71 are supported on the guide rods so as to normally bias the pressure bar away from rear wall 64.

Extending through the bottom wall of the housing are a multiplicity of fixed electrical contacts arranged in two series designated generally by the numerals 72 and 73. The electrical contacts included in the series 72 are conveniently 10 in number and are aligned in electrically insulated relation one from the other and retained in a suitable contact support bar 74 adapted to be inserted through an appropriate aperture formed in the bottom wall of the housing 57. The contact support bar may be securely retained in position by appropriate screws or other means (not shown).

The electrical contacts making up the series 73 are also conveniently mounted in aligned electrically insulated spaced relationship on a contact support bar 76 to be inserted through an aperture in the bottom wall 65 of the housing. It should be understood that there is no physical connection, except through the housing wall 65, between the two contact support bars 74 and 76. These two series of fixed contacts conveniently lie in axial alignment as illustrated in FIG. 12, and lie in opposition to and make resilient contact with a pair of aligned and electrically insulated buss bars 78 and 79. Each of the buss bars 78 and 79 is provided with a multiplicity of projecting resilient contact points 81 and 82, respectively, the contact points on the buss bars being positioned to normally resiliently engage opposing contacts in the series 72 and 73.

As indicated in FIGS. 12 and 13, the buss bars are fixed on the pressure bar 66, and are arranged to move with it so as to make and break electrical contact with the opposed series of contacts held by the contact support bars 74 and 76.

Figure 19:
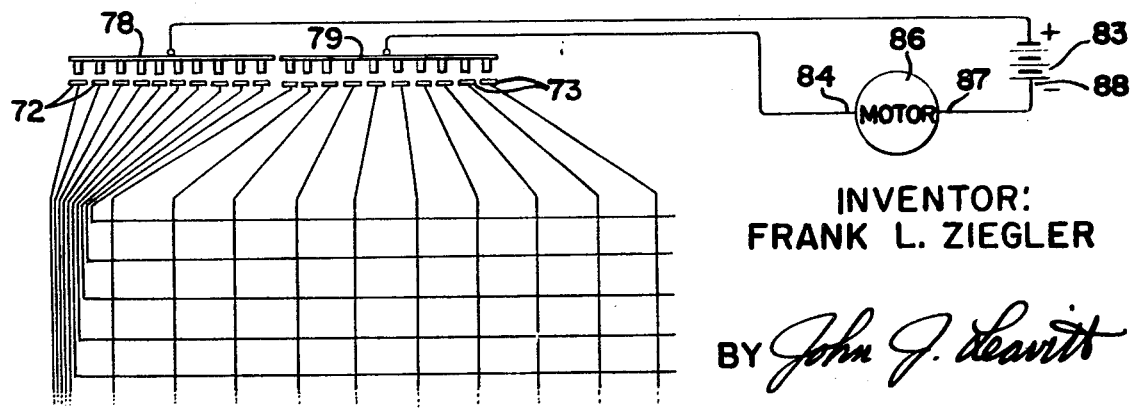
FIG. 19 is a schematic view illustrating the relationship of one set of cross point conductors with the other set thereof, the relationship of both sets of cross point conductors with the two series of fixed contacts, the relationship of these two series of fixed contacts with the opposed movable buss bars, and the relationship of the buss bars with the motor and power source.

As illustrated best in FIG. 19, the buss bar 78 is connected to one terminal of a battery power source 83, and the buss bar 79 is electrically connected to one terminal 84 of a motor 86. The other terminal 87 of the motor is connected to the other terminal 88 of the battery.

Each of the multiplicity of fixed contact fingers supported by the contact bar 74 is connected to a cross point conductor 34 supported in cross point conductor frame 31. In like manner, each of the multiplicity of contact points supported by contact bar 76, which stands in opposition to the buss bar 79, is connected to a cross point conductor 21 supported in cross point conductor frame 13. It will thus be seen that the two buss bars are normally pressed into resilient engagement with the multiplicity of opposing resilient contacts so that these contacts may be said to be normally closed. In this condition of the electrical contact assembly, the motor is held in a nonoperative condition by virtue of the fact that each cross point formed by conductors 21 and 34 is nonconductive. If any one of these cross points is rendered conductive, it will be seen that the circuit will be completed and the motor will be energized.

Means are provided to condition the cross point conductor assembly so that it is required that a correct answer to a question displayed be selected before the motor will be energized. Referring to FIG. 18, such means conveniently comprises a card or plate 91 having a pair of notches 92 and 93 in one edge thereof. The surface 94 of the card is utilized to print or otherwise display a question or problem to be answered or solved. The notches are positioned so that they coincide with predetermined contact points on the buss bars 78–80 and in the two series of fixed contacts 72 and 73.

When the electrically nonconductive lower edge portion 96 of the card is inserted between the contacts, the bottom portion 96 of the card retains all but two of the contacts in a nonconductive or open condition. The two contacts that coincide with the position of notches 92 and 93 remain in their normally closed conductive condition. Since the notch 92 is associated with a single contact point correlated to a single cross point conductor 34, and because the notch 93 is positioned in association with a single contact point correlated to one of the cross point conductors 21, only the cross point that is defined by these two conductors is effective to energize the motor 86.

Referring to FIG. 12, it will be noted that with respect to buss bars 78 and 79, their adjacent ends are spaced and each of the buss bars is provided with a predetermined number of contact points 81, preferably 10, with the contact points of each buss bar being numbered consecutively from zero through nine commencing at the adjacent ends of the buss bars. It will thus be seen that the numbering sequence of the contacts on buss bars 78 and 79 is correlated to the numbering sequence of the conductors 34 and 21 which make up the multiplicity of cross points. Thus, referring to FIGS. 7 and 12, the indicia contained in the upper left-hand rectangle of the face plate is 0 while the next lower rectangle is marked with the indicia 10. Each succeeding lower rectangle is designated by the indicia 20; 30, etcetera, the first digit of these numbers being correlated to the numbers 1, 2, 3, etc., by which succeeding contacts on buss bar 78 are designated.

In like manner, with reference to buss bar 79, each of the contacts 82 commencing at the left end of the buss bar may be considered to be numbered consecutively from zero through nine, with the zero contact being in direct opposition to the fixed contact finger which is connected to the cross point conductor 21 that underlies the upper left-hand area or rectangle of the faceplate and which carries the indicia 0. Reading from this point left to right, it will be noticed that each succeeding cross point conductor 21 is correlated to the similarly numbered contact points on buss bar 79, and correlated to the similarly numbered rectangles on the face plate 41.

Thus, assuming that the card 91 is provided with a notch 92 that registers with the number 5 contact of buss bar 78, while the notch 93 registers with the number 7 contact on buss bar 79, it will be seen that all of the contacts controlling all of the cross points except cross point 57 will be inactivated, thus designating cross point 57 as the correct answer to the question or problem displayed on the card. As illustrated in FIG. 1, any number of cards may be provided, with the lower edge portion of each card coded in any manner that is required to provide the right answer to a question displayed on the card.

As an example, suppose the question-bearing member; i.e., the card, has displayed thereon the question: "Objects falling in a vacuum accelerate at a rate of___ft./sec./sec." To complete the sentence, the correct answer must be associated with the blank space. The answer is obviously the number 32, and selection of cross point number 32 on the face plate will constitute selection of the correct answer.

Such selection may be effected by a stylus 101 (FIG. 1) adapted to be held by the fingers, and having on one end thereof an electrically conductive shoe 102, one section 103 of which is adapted to physically contact one of the cross point conductors 21, while a second section 104 thereof is axially displaced with respect to the contact section 103 and is adapted to make contact with the adjacent cross point conductor 34 so as to complete circuit through the cross point. The question-bearing card in this instance is coded by the provision of notches 92 and 93 in positions corresponding to contact point 3 on buss bar 78 and contact point 2 on buss bar 79. Another question-bearing card might list the arithmetical equation "12×8=___." The answer is of course 96, and selection of cross point 96 would signify selection of a correct answer to this equation.

From the foregoing it will be apparent that any number of different questions may be displayed on differently coded cards. The questions may run the gamut from mathematical problems requiring a solution, to questions involving history or any other subject that it is desired be included on the cards.

To facilitate economical manufacture of the game board assembly, the battery 83 and motor 86 are conveniently enclosed within a unitary housing designated generally by the numeral 106, illustrated in FIGS. 9 through 11. As there shown, the housing is provided with sidewalls 111 and 112, and end walls 113 and 114. Within the hollow interior of the housing formed by these walls, there is provided a battery recess 116 and a motor recess 117. The battery recess is formed by a transverse wall 118 extending between sidewalls 111 and 112. The wall 118 is interrupted adjacent its midpoint by a rectangular aperture 119 formed in the bottom wall 121 of the housing.

Mounted on the floor 121 within the battery well 116 is a conductive buss bar 122 one end 123 of which is adapted to make electrical contact with one terminal of the battery when the battery is slipped into the receptacle formed by the well 116, while the other end 124 of the conductive strip extends through the aperture 119 and is connected to the buss bar 78. The other terminal 88 of the battery is engaged by a spring clip 126 fastened on a dielectric cover plate 127 adapted to slip through guide flanges 128 as shown in FIGS. 10 and 11. The spring contact slip 126 projects into the well 116 as illustrated to make electrical contact with the battery terminal 88. This terminal clip 126 is suitably connected to a conductor which connects terminal 88 of he battery with terminal 87 of the motor contained in motor well 117.

The motor well 117 constitutes a receptacle within a receptacle, being completely enclosed within the housing 106. The walls defining motor well 117 include sidewalls 131 and 132 and end walls 118 and 133. A wall section 134 extending between end wall 133 and end wall 114 of the housing lends rigidity to the structure. To mount the motor within the motor well, the motor well is provided with a pair of mutually projecting flange members 136 and 137 which project inwardly from walls 131 and 132, respectively, and which lie spaced from and parallel to adjacent wall 118. The spaces 138 between flange members 136-137 and adjacent wall 118 are utilized to confine the base flanges 139 of a suitable motor mount 141. It will thus be seen that all that is required to mount the motor is to slip the motor mount flanges 139 into the spaces 138 where it is held by the snug fit which the flanges make in the spaces provided for them.

From FIG. 9, it will be noted that the motor is mounted so that its central axis is perpendicular with respect to the faceplate. The rotor shaft 142 of the motor is thus adapted to project through an aperture 143 formed in a cover plate 144 which overlies the side and end walls of housing 106. Rotatably secured to the rotor adjacent the top cover plate 144 is a dial 146 having indicia dividing the surface 147 of the dial into concentric annular areas 148, 149 and 151. These annular areas of the dial surface are divided into equal segments by diametrically extending lines 152, with each segment of the annular area 149 carrying appropriate indicia correlated to the game being played.

For instance, in the form of the dial illustrated in FIG. 18, the surface of the dial is divided into eight sections, with four of the sections being numbered consecutively from 1 to 4, with the opposite half of the wheel including four additional segments being similarly numbered. Where desired, the concentric annular areas may carry a different color, with the color being correlated to different colors indicated on the small rectangular areas into which the faceplate is divided, as indicated in FIG. 7.

It will thus be seen that the game board assembly may be coded so that a correct answer must be correlated to a color selected on the faceplate as opposed to a number that might be selected. For instance, the faceplate may depict an outline of the United States with each of the various states being correlated to the cross point assembly and the electrical contact assembly through appropriate indicia. Such a faceplate could be used for many different games, or to provide answers to many different questions; for example, questions relating to state birds, animals, flowers, crops, political affiliations, flags, history, geography or mottoes. Separate decks of cards may be made up carrying questions relating to these subjects, appropriately coded to energize the signification means only when a correct answer is selected. Alternatively, decks of cards could be prepared in which a variety of different subjects are represented, so as to lend variety to the types of questions that may be asked and answered.

Having thus described my invention, what is claimed to be novel and sought to be protected by Letters Patent is as follows:

1. In a game board assembly for receiving questions to be answered and signifying selection of a correct answer to a question, the combination comprising:
  a. a main base member;
  b. means on said main base member forming a multiplicity of normally electrically nonconductive cross points each correlated to the correct answer to a different question received in said game board assembly;
  c. electrical contact assembly means supported on the main base member and including a multiplicity of normally closed electrical contacts correlated to said multiplicity of normally electrically nonconductive cross points;
  d. question bearing control means selectively associated with said electrical contact assembly means and operative to retain some of said normally closed electrical contacts in open condition;
  e. means supported on said main base member having thereon indicia associated with said cross points and representing correct answers presented on said question bearing control means;
  f. means for making an electrical circuit through one of said normally electrically nonconductive cross points by selection of an indicia associated therewith representing the correct answer to a question presented on said question bearing control means; and g. means responsive to making of said circuit signifying selection of indicia representing a correct answer.

2. The combination according to claim 1, in which said electrical contact assembly means includes a pair of spaced buss bars constituting movable electrical contacts and two series of separate fixed contacts one series normally electrically engaging one buss of said pair of buss bars and the other series normally electrically engaging the other buss of said pair of buss bars.

3. The combination according to claim 1, in which said question bearing control means comprises a means on which a question is displayed and includes means along one edge thereof to retain all except two of said normally closed electrical contacts in open condition, said two normally closed contacts being correlated to indicia associated with one of said cross points representing the correct answer to the question displayed on said card.

4. The combination according to claim 1, in which said main base frame is generally rectangular and is recessed to receive said cross point assembly, said electrical contact assembly means, and said question bearing control means.

5. The combination according to claim 1, in which said means forming said multiplicity of normally nonconductive cross points includes first and second generally rectangular frames each including a multiplicity of spaced parallel conductors, the conductors of said first frame being oriented generally to intersect the conductors of said second frame.

6. The combination according to claim 1, in which said means supported on said main base member having indicia thereon comprises a face plate superimposed over said cross points and detachably secured to said main base member.

7. The combination according to claim 1, in which said means for making an electrical circuit through a selected one of said cross points comprises conductor means selectively engageable with the conductors forming said cross point.

8. The combination according to claim 1, in which said means signifying selection of indicia representing a correct answer includes a motor having a rotor, and a dial on the rotor rotatable therewith.

9. The combination according to claim 1, in which said electrical contact assembly means includes a card feed housing having therein a spring-pressed pressure bar, a pair of spaced buss bars constituting movable electrical contacts mounted on said spring-pressed pressure bar, and two series of separate fixed contacts supported on said base and engageable and disengageable by said buss bars when moved toward and away from said fixed contacts, respectively, one series of said fixed contacts normally electrically engaging one buss of said pair of buss bars and the other series of fixed contacts normally electrically engaging the other buss of said pair of buss bars.

10. The combination according to claim 2, in which said question bearing control means comprises a means on which a question is displayed and includes means along one edge thereof to retain all except two of said normally closed electrical contacts in open condition, one of said two closed contacts being associated with one of said series of fixed contacts and the other of said two closed contacts being associated with the other of said series of fixed contacts.

11. The combination according to claim 3, in which said question bearing control means comprises a card bearing a question, one edge of said card having two notches correlated to said two normally closed contacts in open condition.

12. The combination according to claim 5, in which spacer means are disposed between the cross point conductors of said first and second frames, said spacer means including spaced parallel bars extending thereacross, the spacing of said bars corresponding to the spacing of the parallel conductors of one of said first and second frames forming said cross points.

13. The combination according to claim 6, in which said face plate is provided with means associated with each crosspoint enabling selective conductive interconnection of the conductors forming the cross point so as to complete an electrical circuit through the selected cross point.

14. The combination according to claim 7, in which said means supported on said main base member having indicia thereon comprises a faceplate apertured at the occurrence of each cross point to give access thereto, and said conductor means comprises a hand-held stylus having a conductive portion thereon for completing a circuit through a selected cross point when the stylus is inserted through one of said apertures.

15. The combination according to claim 9, in which said means signifying selection of indicia representing a correct answer to a question includes a motor having a pair of terminals, a source of power for said motor and also having a pair of terminals one of which terminals is connected to one terminal of the motor, and conductor means connecting one terminal of the motor and the other buss bar of the pair to the remaining terminal of the power source.

16. The combination according to claim 10, in which said question bearing control means comprises a card bearing a question, one edge of said card having two notches correlated to said two normally closed contacts in open condition.

17. The combination according to claim 10, in which said multiplicity of cross points are formed by two sets of spaced conductors, the conductors of one set being oriented to intersect the conductors of the other set, and said multiplicity of fixed contacts of one series are respectively conductively connected to the conductors of one set of cross point conductors and the contacts of the other series of fixed contacts are respectively conductively connected to the conductors of the other set of cross point conductors.